United States Patent [19]

Roy et al.

[11] Patent Number: 6,047,934
[45] Date of Patent: Apr. 11, 2000

[54] TOOL HOLDER

[75] Inventors: Michael Roy, St. Brampton; Anthony Osborne, Brampton, both of Canada

[73] Assignee: Chrysler Corporation, Auburn Hills, Mich.

[21] Appl. No.: 09/118,667

[22] Filed: Jul. 17, 1998

[51] Int. Cl.[7] .................................................. A47B 96/06
[52] U.S. Cl. ...................................... 248/231.71; 296/76
[58] Field of Search ..................... 248/231.71, 231.41, 248/230.6, 309.1, 231.85; 296/76; 292/276, 258, 339, 27 E

[56] References Cited

U.S. PATENT DOCUMENTS

| | | | |
|---|---|---|---|
| 2,452,301 | 10/1948 | Hester | 248/231.71 |
| 3,180,668 | 4/1965 | Brown | 292/276 |
| 3,525,687 | 8/1970 | Ross et al. | 296/76 |
| 4,206,944 | 6/1980 | Kumagai et al. | 296/76 |
| 4,893,863 | 1/1990 | Skonieczny et al. | 296/76 |
| 4,953,820 | 9/1990 | Yoder | 248/231.5 |
| 5,029,930 | 7/1991 | Ihrke et al. | 296/76 |
| 5,074,609 | 12/1991 | Dear | 296/76 |
| 5,156,265 | 10/1992 | McCaig et al. | 248/160 |
| 5,158,333 | 10/1992 | Saville | 296/76 |
| 5,163,724 | 11/1992 | Conte | 292/258 |
| 5,228,737 | 7/1993 | Zimmerman | 296/76 |
| 5,584,099 | 12/1996 | Westerdale | 16/245 |
| 5,873,619 | 2/1999 | Lewkoski et al. | 296/76 |

*Primary Examiner*—Leslie A. Braun
*Assistant Examiner*—Tan Le
*Attorney, Agent, or Firm*—Lawrence J. Shurupoff

[57] ABSTRACT

A tool holder for holding a tool on a hinge plate of a deck lid of a motor vehicle. The tool holder has a body in the form of a collar made of two separate parts secured together by screws. The body parts cooperate in defining a recess shaped to retain the tool when the body parts are secured together but to release the tool when the body parts are separated. A generally L-shaped bracket projects from the body and, with the body, defines a channel for receiving a flange on the hinge plate. A hanger has a cylinder secured to the bracket. A slide bar mounted in the cylinder moves from a retracted position to an extended position across the channel. In its extended position, the slide bar extends through a hole in the hinge flange to suspend the tool holder. The body of the tool holder also has a magnet for contacting the hinge plate to magnetically hold the tool holder on the hinge plate.

5 Claims, 4 Drawing Sheets

TOOL HOLDER

This invention relates generally to tool holders and more particularly to a holder for mounting a tool such as a nut runner on a workpiece.

BACKGROUND AND SUMMARY OF THE INVENTION

The deck lid for the trunk of a motor vehicle typically is connected to the vehicle body by hinges at its front right and left corners. In order for a worker to bolt the deck lid to the hinges, it has been necessary for the deck lid to be raised so that he or she can get into the trunk space to reach the hinges. However, if the bolting takes place while the deck lid is in its raised position, it may not be properly aligned with the trunk opening, causing interference when the deck lid is closed. Proper alignment would be assured if bolting of the deck lid to the hinges were to take place with the deck lid in the closed position.

According to this invention, a tool holder is provided for a tool, in this case a nut runner. The tool holder mounts the nut runner on one of the hinges. An air pressure line to the nut runner allows it to be operated from a position at the rear of the vehicle so that the deck lid may be closed while a nut is tightened on a bolt to secure the deck lid to the hinge. It is not necessary for the operator to reach into the trunk space. Further in accordance with the invention, the tool holder includes a tool holder body for holding the tool. The tool holder body is preferably a two-part collar. The body parts define a recess shaped to retain the tool when the body parts are secured together but to release the tool when the body parts are separated.

The means for mounting the tool holder on one of the hinges preferably includes a hanger, which includes a slide bar that is movable into and out of engagement with the hinge. In the embodiment about to be disclosed, the tool holder has an L-shaped bracket with a first leg projecting outwardly from the tool holder body and a second leg projecting from the first leg in spaced relation to the body. The bracket and body define a channel for receiving a flange of the hinge. The hanger preferably includes a cylinder secured to the second leg of the bracket for slidably supporting the slide bar from a retracted position to an extended position extending across the channel. In this extended position of the slide bar, it extends through a hole in the flange of the hinge to suspend the tool holder. Preferably the body of the tool holder has a recess to receive the end of the slide bar when the slide bar is extended.

The tool holder body also may carry a magnet which contacts the hinge and magnetically holds the tool holder thereto.

One object of this invention is to provide a tool holder having the foregoing features and capabilities.

Another object is to provide a tool holder which is composed of a relatively few simple parts, is rugged and durable in use, and is capable of being inexpensively manufactured and easily operated.

These and other objects, features and advantages of the invention will become more apparent as the following description proceeds, especially when considered with the accompanying drawings.

DETAILED DESCRIPTION OF THE PREFERRED EMBODIMENT

Figure 1:
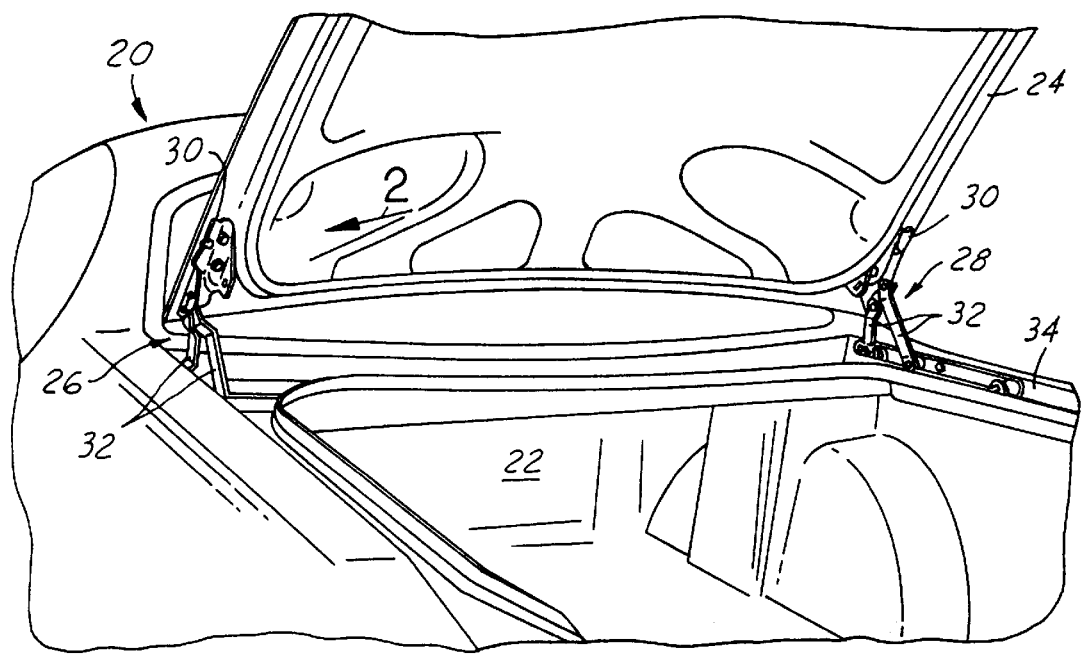
FIG. 1 is a fragmentary perspective view of the rear of an automobile with the deck lid raised.
Figure 2:
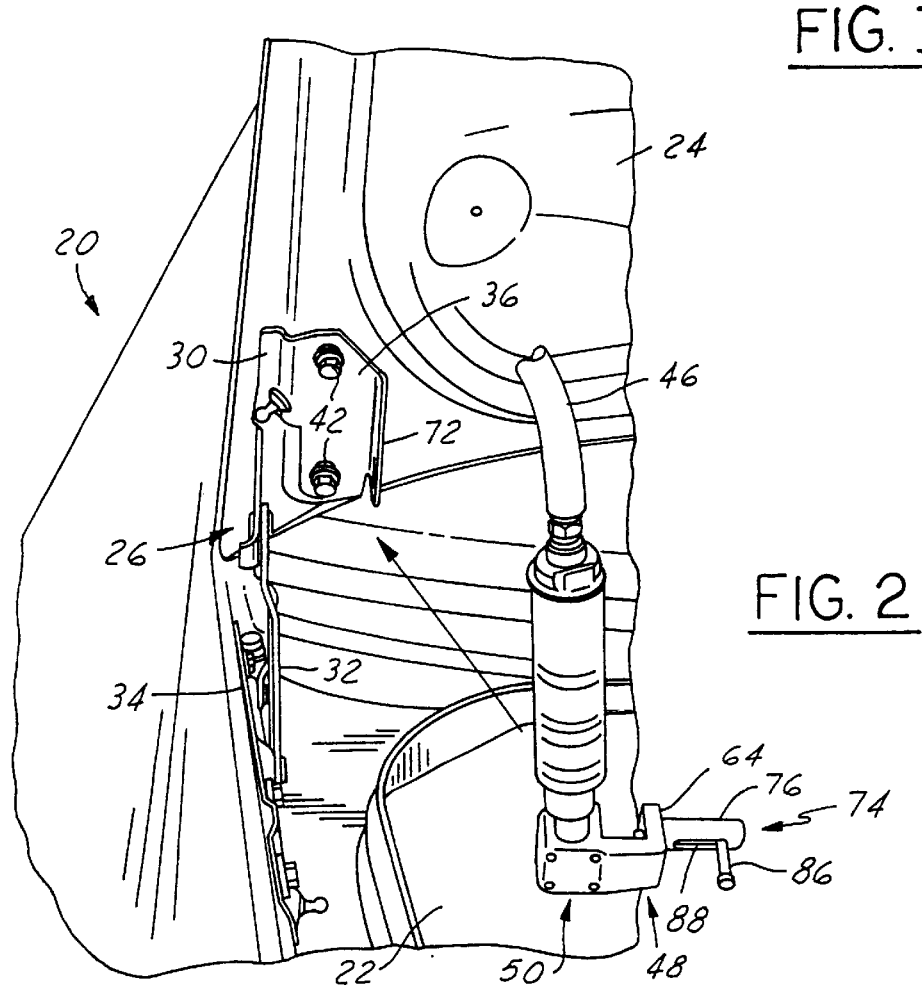
FIG. 2 is a fragmentary perspective view of a portion of FIG. 1 showing a tool holder embodying the invention supporting a tool. The tool holder and tool are shown separated from a hinge for the deck lid.
Figure 3:
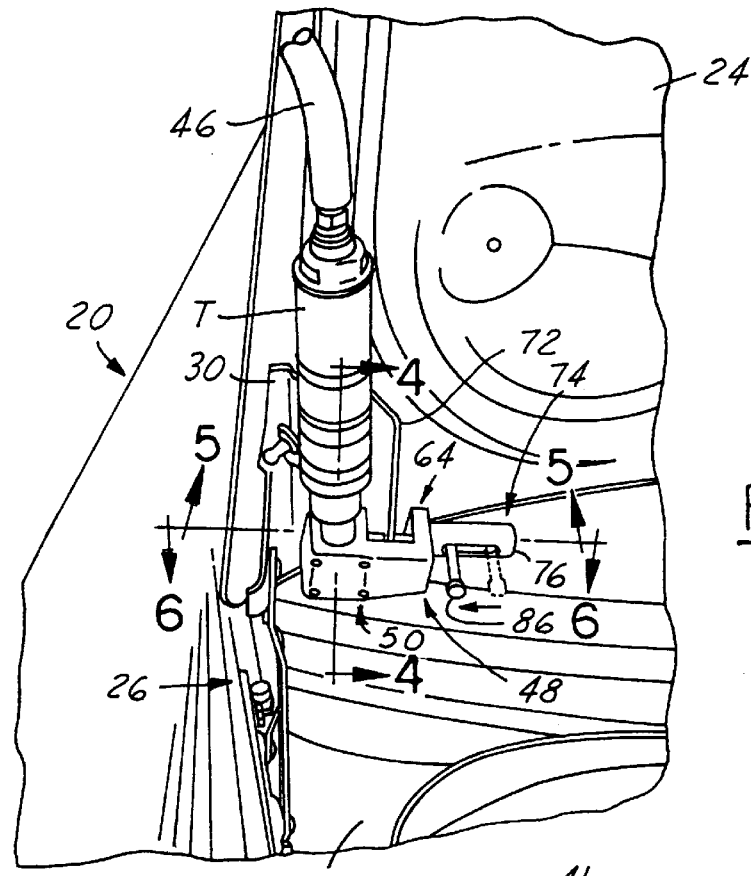
FIG. 3 is a view similar to FIG. 2 but shows the tool holder attached to the hinge.
Figure 4:
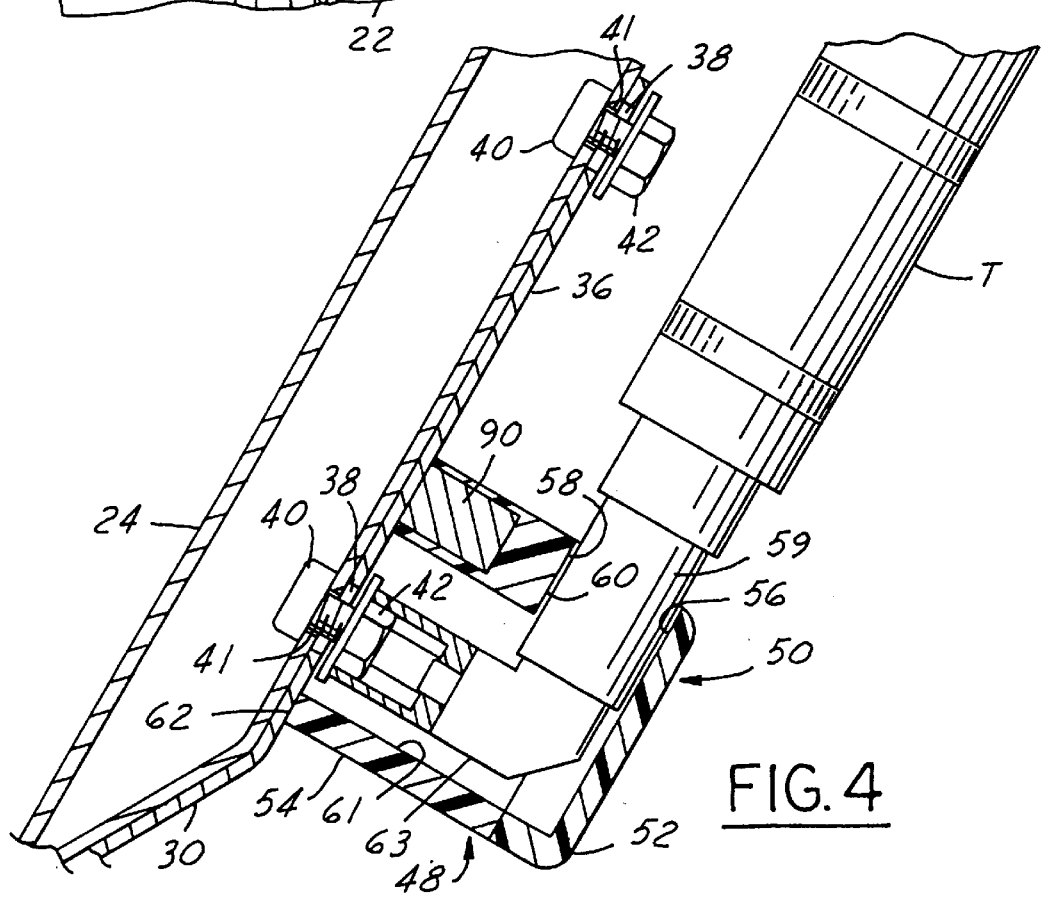
FIG. 4 is a sectional view taken on the line 4—4 of FIG. 3.
Figure 5:
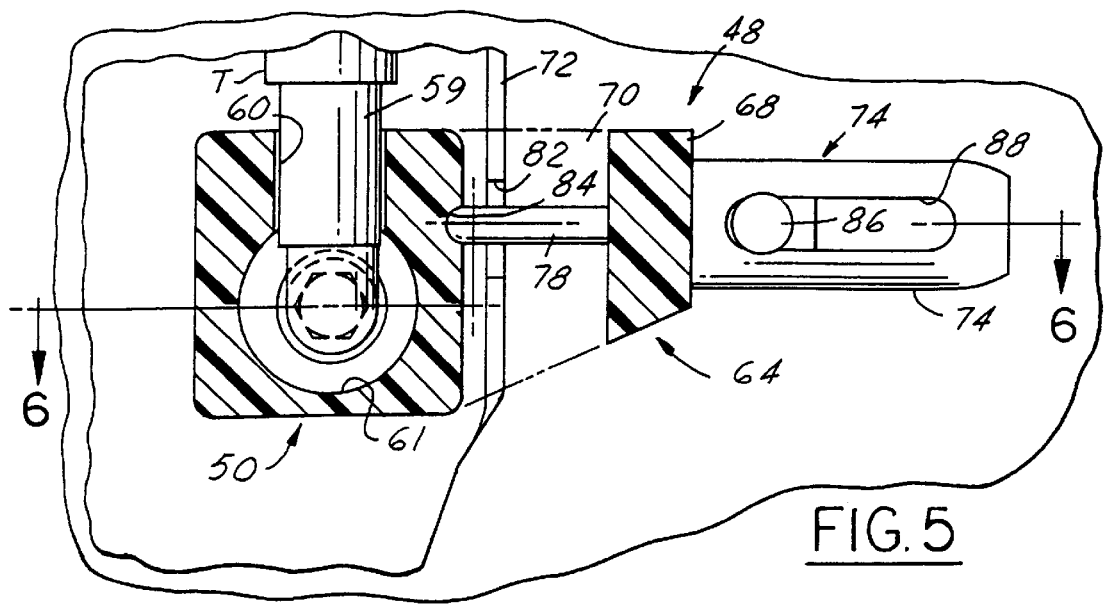
FIG. 5 is a sectional view taken on the line 5—5 in FIG. 3.
Figure 6:
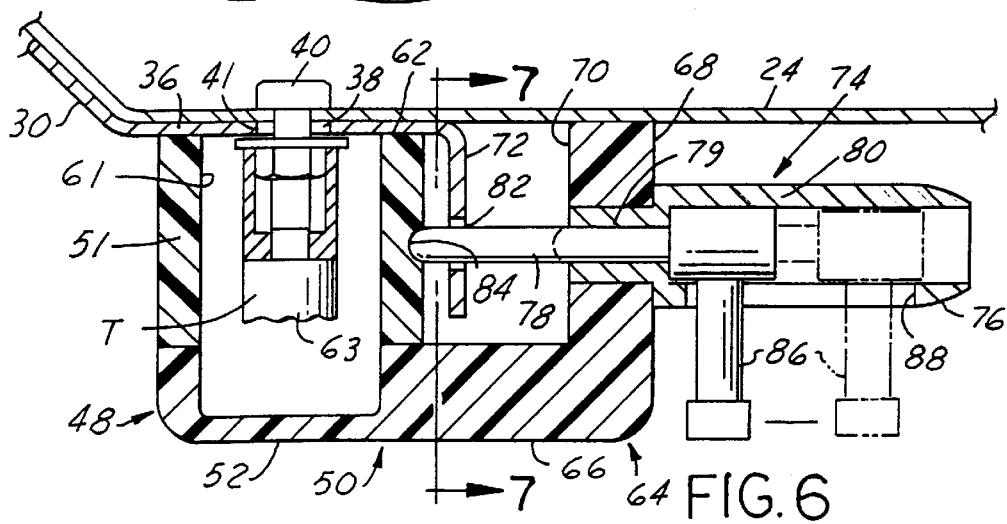
FIG. 6 is a sectional view taken on the line 6—6 in FIGS. 3 and 5.
Figure 7:
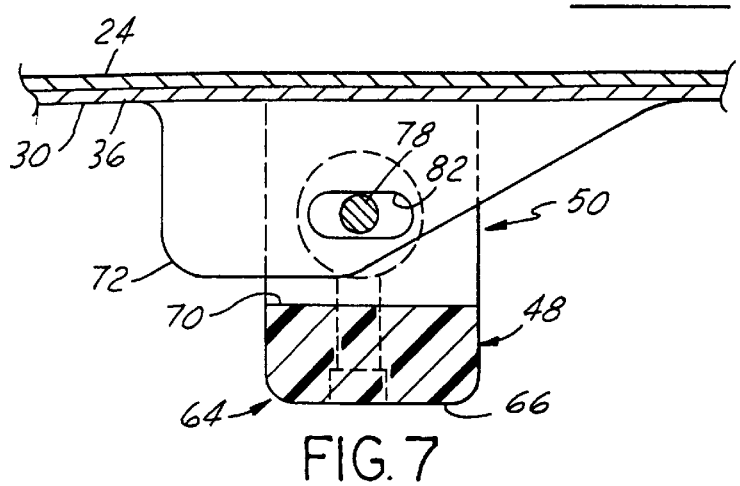
FIG. 7 is a sectional view taken on the line 7—7 in FIG. 6.
Figure 8:
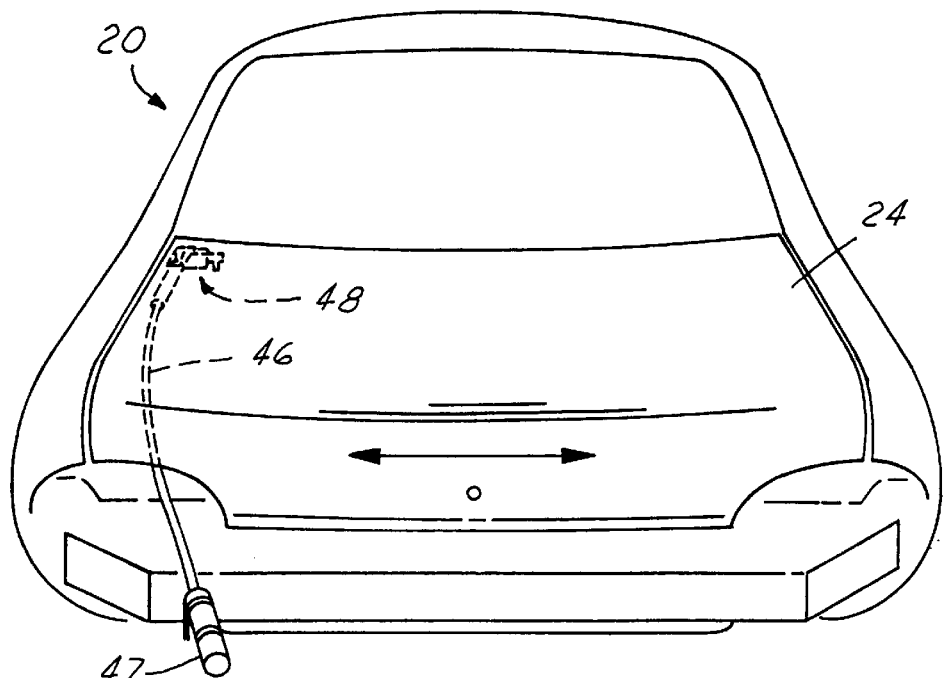
FIG. 8 is a rear view of the automobile with the deck lid closed, during attachment of the deck lid to a hinge.
Figure 9:
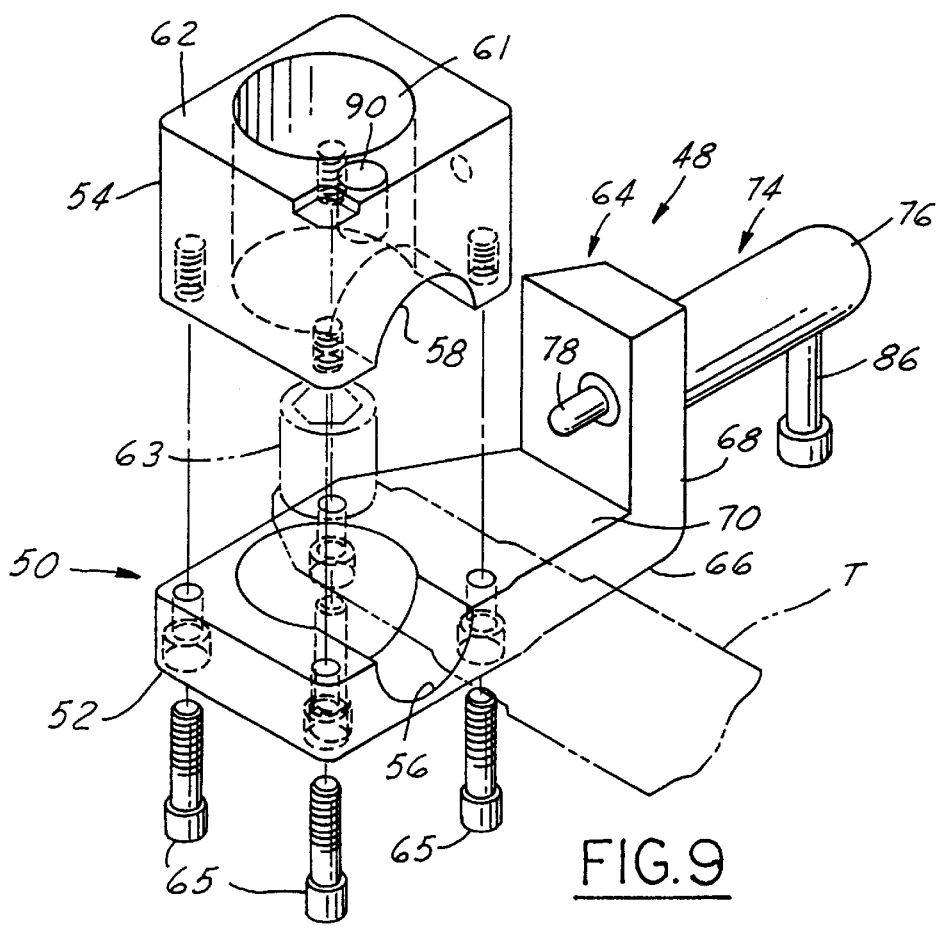
FIG. 9 is an exploded perspective view of the tool holder, showing a portion of the tool in broken lines.

Referring now more particularly to the drawings, and especially to FIGS. 1–3, there is shown a vehicle 20 having a rear trunk space 22 adapted to be closed by a deck lid 24. The deck lid is hinged at the front right and left corners by hinge assemblies 26 and 28 which are mirror images of one another. Each hinge assembly includes a hinge plate 30 pivoted to the front ends of links 32. The rear ends of the links 32 are pivoted to fixed frame members 34. The plate 30 of each hinge assembly has a flat attaching plate portion 36 with holes 38 (FIG. 4). Bolts 40 extend through holes 38 in the flat attaching portions 36 of the hinge plates 30 and through holes 41 in the deck lid. Nuts 42 are threaded on the bolts to secure the deck lid to the flanges 30. nuts 40 are tightened by a power operated air tool T, often referred to as a nut runner. An air pressure line 46 from the tool T leads to a handle 47 (FIG. 8) which has an on-off switch for operating the tool. The tool T is mounted on hinge plate 30 by a tool holder 48 constructed in accordance with this invention.

Referring particularly to FIGS. 4–7 and 9, the tool holder 48 has a body 50 which fits around the nut driving end of the tool T. The body 48 is in the form of a collar made of two separable parts 52 and 54 which are formed with concave depressions 56 and 58 that together form a cavity or recess 60 for receiving and retaining the end portion 59 of the tool T. The body parts are connected together by fasteners in the form of screws 65. The tool T is captured in the recess when the body parts 52 and 54 are secured together but can be removed when the screws are withdrawn and the body parts separated. The body part 54 has a open space 61 leading from the outer end 62 of the body part into the recess 60 to receive the right-angle extremity 63 of the tool T.

The tool holder has a bracket 64 (FIG. 9) of generally L-shaped configuration. A first leg 66 of the bracket is integrally connected to and projects laterally outwardly from the body part 52. A second leg 68 projects from the first leg in laterally spaced relation to the body. The bracket 64 and body 50 together define a channel 70 for receiving a right angle flange 72 (FIG. 5) of the plate portion 36 of the hinge plate 30.

A hanger 74 includes a cylinder 76 having one end secured to the leg 68 of the bracket. An elongated slide bar 78 has an enlarged piston 80 (FIG. 6) at one end axially slidably mounted in the cylinder for movement from a retracted position to an extended position. The slide bar 78 extends through a hole 79 in the leg 68 and in its extended position it extends across the channel 70 and through a hole 82 in the flange 72 of the hinge plate portion 36 with the end of the slide bar 78 received in a recess 84 in the side of the body part 54. The slide bar has a handle 86 projecting laterally from the piston 80 through an elongated slot 88 in the cylinder 76 which is used to manually extend and retract the slide bar.

A magnet 90 (FIG. 9) embedded in the body part 54 has one end exposed and flush with the outer end 62 of the body part.

In use, the two parts 52 and 54 of the body 50 are assembled around the end of the tool T with the end of the tool disposed in the recess 60 of the body. The deck lid is maneuvered into position so that a mounting hole 41 in a corner of the deck lid lines up with one of the holes 38 in the attaching plate portion 36 of one of the hinge plates. A bolt 40 is extended through the aligned holes in the deck lid and in the attaching plate portion 36 of the hinge plate and a nut 42 is loosely threaded on the bolt. The tool holder 48 is then placed under the flat attaching portion 36 of the hinge plate 30 so that the magnet 90 engages and holds the body 50 against the flat attaching portion 36 but permits the tool holder to be adjusted into proper position. In this position, the flange 72 of the plate portion 36 of the hinge plate projects down into the channel 70 of the tool holder. The slide bar 78 is advanced through the hole 82 in the flange 72 of the hinge plate with the end of the slide bar extending into the recess 84 in the side of the body part 54. The tool holder and tool are now suspended from the hinge plate 30 by the slide bar 78 of hanger 74, and also held by the magnet 90. Some further maneuvering of the tool holder and tool holder body may be necessary to cause the tool T to engage the nut 42. Thereafter, the deck lid may be closed and the tool T operated to tighten the nut, under the control of an operator at the rear of the vehicle. The line 46 from the tool T leads through an opening in the body of the vehicle, such as a cavity provided for a tail light assembly, so that the deck lid may be fully closed. After the nut is tightened, the deck lid may be opened and the process repeated to attach the tool holder body and tool to the other hinge plate to mount the other corner of the deck lid to the other hinge.

It will be noted that there are two nut and bolt assemblies for each hinge (see FIGS. 1 and 2). One such nut and bolt assembly of each hinge may be attached by the tool using the tool holder of this invention. The other nut and bolt assemblies may be applied with the deck lid open, not requiring the tool holder.

What is claimed is:

1. A tool holder for releasably holding a tool on a workpiece, comprising:

a tool holder body having a first recess formed therein for receiving and supporting said tool; and means for mounting said tool holder on the workpiece comprising a hanger movable into and out of engagement with said workpiece, wherein said body comprises a collar made of two separable parts secured together by releaseable fastener means, said body parts cooperating to define a recess shaped to retain said tool therein when said body parts are secured together but to release said tool only when said body parts are separated.

2. A tool holder for releasably holding a tool on a workpiece comprising:

a tool holder body having means for holding the tool, means for mounting said tool holder body on the workpiece comprising a hanger having a slide bar movable into and out of engagement with the workpiece, a bracket mounting said hanger on the tool holder body, wherein said bracket is generally L-shaped having a first leg projecting laterally outwardly from said body and a second leg projecting from said first leg in laterally spaced relation to said body, said bracket and said body defining a channel for receiving a portion of the workpiece, said hanger including a cylinder secured to the second leg of said bracket, said slide bar being axially slidably mounted in said cylinder for movement from a retracted position to an extended position extending across said channel in which latter position it is adapted to engage the portion of the workpiece in said channel to suspend the tool holder thereon, and further including a magnet on said body for contacting the workpiece and magnetically holding the tool holder on the workpiece.

3. A tool holder for releasably holding a tool on a workpiece comprising:

a tool holder body having means for holding the tool, means for mounting said tool holder body on the workpiece comprising a hanger having a slide bar movable into and out of engagement with the workpiece, a bracket mounting said hanger on the tool holder body, wherein said bracket is generally L-shaped having a first leg projecting laterally outwardly from said body and a second lea projecting from said first leg in laterally spaced relation to said body, said bracket and said body defining a channel for receiving a portion of the workpiece, said hanger including a cylinder secured to the second leg of said bracket, said slide bar being axially slidably mounted in said cylinder for movement from a retracted position to an extended position extending across said channel in which latter position it is adapted to engage the portion of the workpiece in said channel to suspend the tool holder thereon, and wherein said body comprises a collar made of two separable parts secured together by releaseable fastener means, said body parts cooperating to define a recess shaped to retain said tool therein when said body parts are secured together but to release said tool only when said body parts are separated.

4. A tool holder as in claim 3, wherein said body has a recess adapted to receive an end of said slide bar when said slide bar is in its extended position.

5. A tool holder as in claim 4, further including a magnet on said body for contacting the workpiece and magnetically holding the tool holder on the workpiece.

* * * * *